United States Patent
Funahara et al.

(10) Patent No.: US 12,127,038 B2
(45) Date of Patent: Oct. 22, 2024

(54) REMOTE OPERATION SYSTEM AND REMOTE OPERATION SERVER

(71) Applicant: KOBELCO CONSTRUCTION MACHINERY CO., LTD., Hiroshima (JP)

(72) Inventors: Yusuke Funahara, Hiroshima (JP); Hitoshi Sasaki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 450 days.

(21) Appl. No.: 17/611,704

(22) PCT Filed: Apr. 9, 2020

(86) PCT No.: PCT/JP2020/016053
§ 371 (c)(1),
(2) Date: Nov. 16, 2021

(87) PCT Pub. No.: WO2020/250557
PCT Pub. Date: Dec. 17, 2020

(65) Prior Publication Data
US 2022/0213666 A1    Jul. 7, 2022

(30) Foreign Application Priority Data

Jun. 10, 2019  (JP) .................................. 2019-108275

(51) Int. Cl.
*H04W 28/06* (2009.01)
*E02F 9/26* (2006.01)
(Continued)

(52) U.S. Cl.
CPC ............. *H04W 28/06* (2013.01); *E02F 9/261* (2013.01); *G05D 1/0038* (2013.01); *H04W 28/00* (2013.01); *H04W 28/0215* (2013.01)

(58) Field of Classification Search
CPC . H04W 28/0215; H04W 28/06; H04W 28/00; G05D 1/0038
See application file for complete search history.

(56) References Cited

U.S. PATENT DOCUMENTS

| 7,145,595 B2 | 12/2006 | Yamane et al. |
| 2006/0047377 A1 | 3/2006 | Ferguson et al. |
| 2020/0348665 A1* | 11/2020 | Bhanushali .......... H04N 19/167 |

FOREIGN PATENT DOCUMENTS

| EP | 3 225 750 A1 | 10/2017 |
| EP | 3 923 569 A1 | 12/2021 |

(Continued)

OTHER PUBLICATIONS

Extended European search report dated May 17, 2022 issued in corresponding EP Patent Application No. 20823703.2.

*Primary Examiner* — Zachary K Huson
(74) *Attorney, Agent, or Firm* — Carrier, Shende & Associates P.C.; Fulchand P. Shende; Joseph P. Carrier (57) ABSTRACT

According to the remote operation system or a remote operation server 20 included in the remote operation system, when the "environment information control process" is performed, a data amount of environment data is reduced such that the reduction in the information amount of one or a plurality of low environment information factors is greater than the reduction in the information amount of one or a plurality of high environment information factors (meaning the reduction in the information amount of the environment information due to a change in the environment information factor). The environment information control process is performed by classifying the environment information factors into the high environment information factor and the low environment information factor according to a difference in the operation state.

5 Claims, 6 Drawing Sheets

(51) Int. Cl.
  *G05D 1/00*    (2024.01)
  *H04W 28/00*   (2009.01)
  *H04W 28/02*   (2009.01)

(56) References Cited

FOREIGN PATENT DOCUMENTS

| | | |
|---|---|---|
| JP | 2001-292439 A | 10/2001 |
| JP | 2003-076978 A | 3/2003 |
| JP | 2017-092908 A | 5/2017 |

* cited by examiner

REMOTE OPERATION SYSTEM AND REMOTE OPERATION SERVER

TECHNICAL FIELD

The present invention relates to a system for remotely operating a work machine and the like.

BACKGROUND ART

It is essential that the communication is not disrupted to enable a smooth operation of a work machine such as a construction machine when the work machine is remotely operated. There is proposed a method of limiting an information amount of video provided to an operator or selectively providing only a directional video according to a pivoting direction of an upper pivoting body of the work machine among a plurality of different-directional videos with reference to the work machine, in a state where it is assumed that the operator has no intention to remotely operate the work machine (for example, in a state where a gateway cutoff lever is raised), (for example, see Patent Literature 1).

CITATION LIST

Patent Literature

Patent Literature 1
Japanese Patent Laid-Open No. 2017-092908

SUMMARY OF INVENTION

Technical Problem

However, the above-described state may make it difficult for the operator to grasp the environment of the work machine only by limiting the information amount of video or selectively outputting the specific-directional video.

The present invention has an object to provide mainly a system capable of reducing a data communication load for outputting environment information, while avoiding excessive reduction in an information amount of the environment information in an appropriate form from the standpoint of an operator appropriately grasping an environment of a work machine according to an operation state of the work machine by the operator.

Solution to Problem

A remote operation server of the present invention is a remote operation server having a function of mutual communication with a work machine and a remote operation device for remotely operating the work machine, the remote operation server comprising a state recognition element configured to recognize an operation state of the remote operation device by an operator or a motion state of the work machine, and an environment information control process element configured to perform an environment information control process for adjusting each of a plurality of environment information factors in different modes according to a difference in the operation state of the remote operation device or the motion state of the work machine that is recognized by the state recognition element so that a data amount of environment data is reduced, the environment information factor being output in an information output device included in the remote operation device and defining an information amount of environment information according to the environment data acquired by an environment recognition device included in the work machine, the environment data indicating an environment of the work machine.

A remote operation system of the present invention comprises a work machine, a remote operation device for remotely operating the work machine, and the remote operation server.

DESCRIPTION OF EMBODIMENTS (Configuration)

Figure 1:
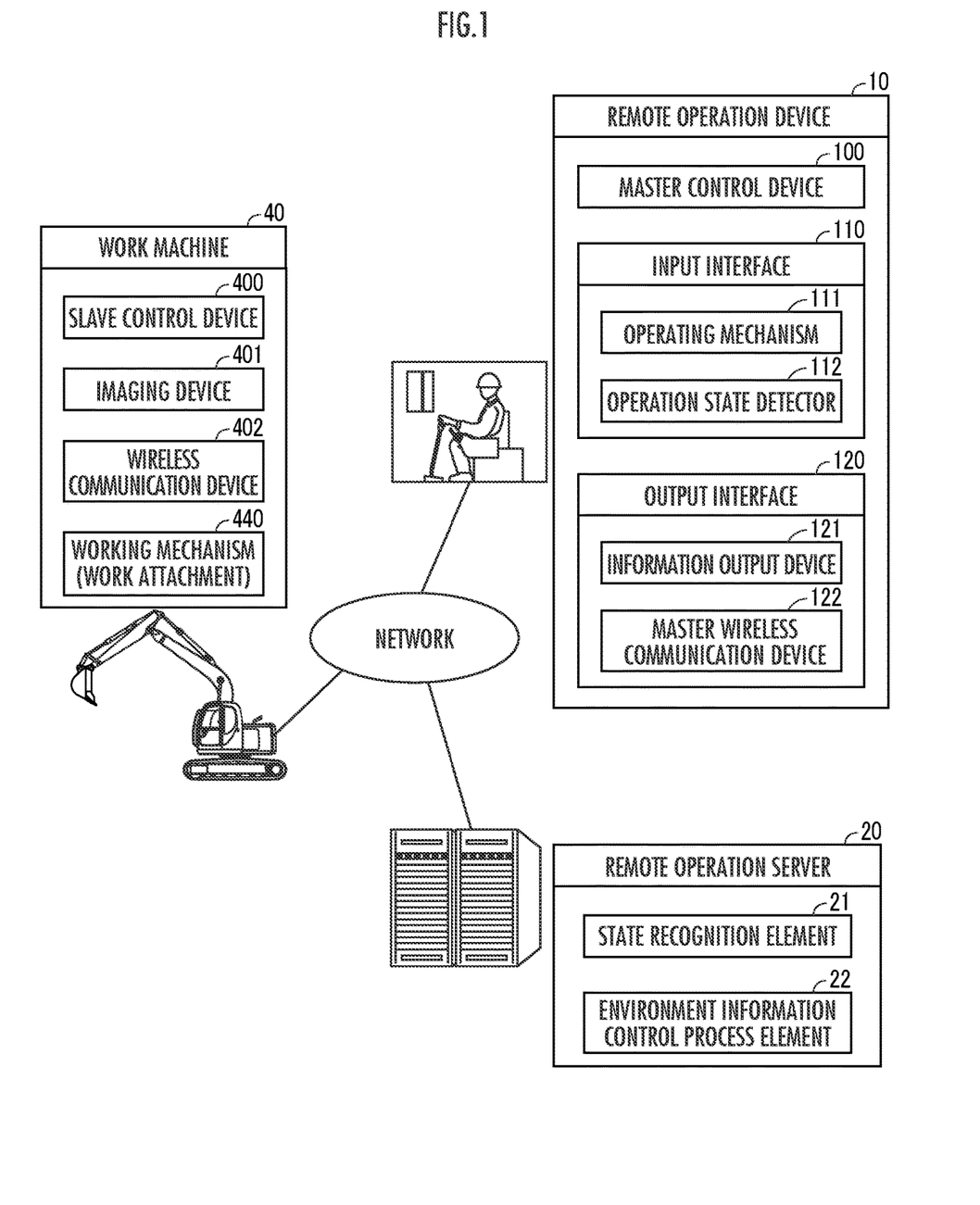
FIG. 1 is an illustrative diagram illustrating a configuration of a remote operation system as one embodiment of the present invention.

A remote operation system as one embodiment of the present invention illustrated in FIG. 1 comprises a remote operation device 10, a remote operation server 20, and a work machine 40.

(Configuration of Work Machine)

The work machine 40 comprises a slave control device 400, an environment recognition device 401, a wireless communication device 402, and a working mechanism 440. The slave control device 400 is comprised of an arithmetic processing device (a single core processor, a multi-core processor, or processor cores that constitute the multi-core processor), which reads necessary data and software from a memory or other storage device, and executes arithmetic processing on the data according to the software.

Figure 2:
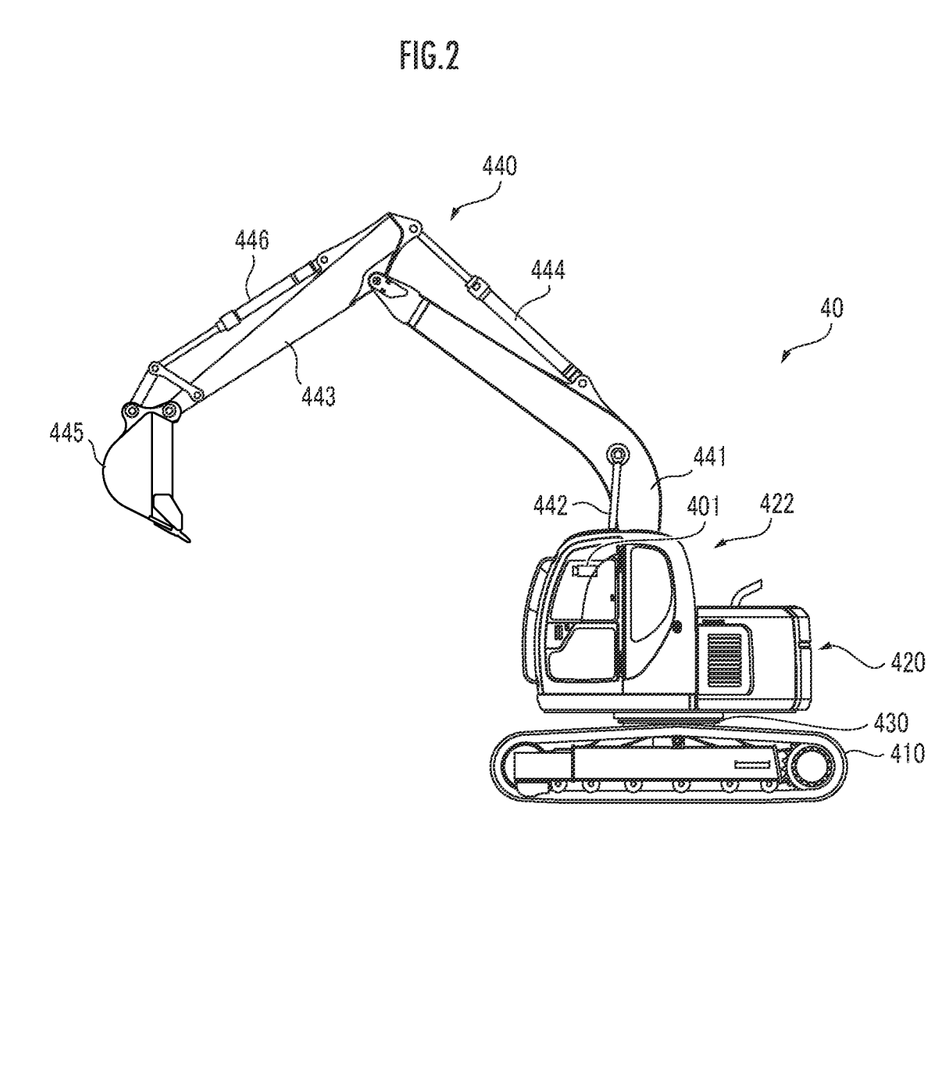
FIG. 2 is an illustrative diagram illustrating a configuration of a work machine.

The work machine 40 is, for example, a crawler excavator (construction machine), and comprises a crawler type lower traveling body 410, and an upper pivoting body 420 pivotally mounted on the lower traveling body 410 through the intermediary of a pivoting mechanism 430 as illustrated in FIG. 2. A cab (driver compartment) 422 is provided on the left front side of the upper pivoting body 420. A work attachment 440 is provided at the front center of the upper pivoting body 420.

The work attachment 440 serving as a working mechanism comprises a boom 441 liftably attached to the upper pivoting body 420, an arm 443 rotatably connected to the distal end of the boom 441, and a bucket 445 rotatably connected to the distal end of the arm 443. To the work attachment 440, there are attached a boom cylinder 442, an arm cylinder 444, and a bucket cylinder 446 that are comprised of expandable hydraulic cylinders.

The boom cylinder 442 is interposed between the boom 441 and the upper pivoting body 420 such that the boom cylinder 442 expands or contracts by receiving the supply of hydraulic oil to thereby cause the boom 441 to pivot in an upward or downward direction. The arm cylinder 444 is interposed between the arm 443 and the boom 441 such that the arm cylinder 444 expands or contracts by receiving the supply of hydraulic oil to thereby cause the arm 443 to pivot on a horizontal axis with respect to the boom 441. The bucket cylinder 446 is interposed between the bucket 445 and the arm 443 such that the bucket cylinder 446 expands or contracts by receiving the supply of hydraulic oil to thereby cause the bucket 445 to pivot on the horizontal axis with respect to the arm 443.

The environment recognition device 401 is installed in the cab 422, for example, and is comprised of an imaging device configured to capture an image of an environment including at least a part of the working mechanism 440 through a front windshield of the cab 422. The environment recognition device 401 may comprise an acoustic input device comprised of a microphone or the like.

In the cab 422, there are provided actual machine operation levers corresponding to respective operation levers (described later) included in the remote operation device 10, and a drive mechanism or a robot configured to receive a signal according to an operation mode of each operation lever from a remote operation room and move the corresponding actual machine operation lever based on the received signal.

(Configuration of Remote Operation Device)

The remote operation device 10 comprises a master control device 100, an input interface 110, and an output interface 120. At least a part of the remote operation device 10 may be comprised of a mobile terminal device such as a smartphone, a tablet terminal or a notebook PC. The master control device 100 is comprised of an arithmetic processing device (a single core processor, a multi-core processor, or processor cores that constitute the multi-core processor), which reads necessary data and software from a memory or other storage device, and executes arithmetic processing on the data according to the software.

The input interface 110 comprises an operating mechanism 111, and an operation state detector 112. The output interface 120 comprises an information output device 121, and a wireless communication device 122.

The operating mechanism 111 includes a travel operation device, a pivoting operation device, a boom operation device, an arm operation device, a bucket operation device, and a cutoff operation device. Each operation device has an operation lever to be subjected to a pivoting operation. The operation lever (travel lever) of the travel operation device is operated to move the lower traveling body 410. The travel lever may also serve as a travel pedal. For example, the travel pedal fixed to the base or lower end of the travel lever may be provided. The operation lever (pivoting lever) of the pivoting operation device is operated to move a hydraulic pivoting motor included in the pivoting mechanism 430. The operation lever (boom lever) of the boom operation device is operated to move the boom cylinder 442. The operation lever (arm lever) of the arm operation device is operated to move the arm cylinder 444. The operation lever (bucket lever) of the bucket operation device is operated to move the bucket cylinder 446.

The operation lever (cutoff lever) of the cutoff operation device is locked such that the work machine 40 is not moved even when each operation lever such as the travel lever as described above is operated, while is operated to release the lock.

Figure 3:
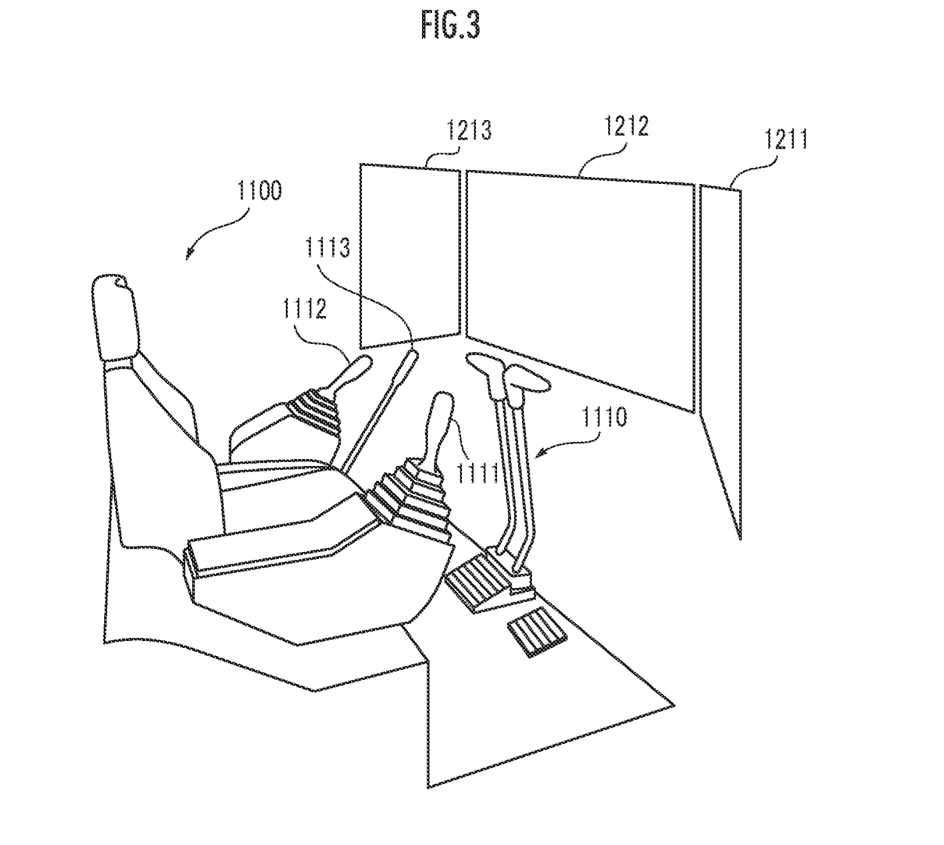
FIG. 3 is an illustrative diagram illustrating a configuration of a remote operation device.

Each operation lever constituting the operating mechanism 111 is arranged, for example, around a seat 1100 for an operator to sit on, as illustrated in FIG. 3. The seat 1100 is in the form of a high-back chair with armrests, but may be in any form that allows an operator to sit thereon, such as a low-back chair without a headrest, or a chair without a backrest.

A pair of left and right travel levers 1110 corresponding to the left and right crawlers are arranged side by side in front of the seat 1100. A single operation lever may serve as a plurality of operation levers. For example, a right operation lever 1111 provided in front of a right frame of the seat 1100 illustrated in FIG. 3 may function as the boom lever when operated in a front-rear direction, and may function as the bucket lever when operated in a left-right direction. Similarly, a left operation lever 1112 provided in front of a left frame of the seat 1100 illustrated in FIG. 3 may function as the arm lever when operated in the front-rear direction, and may function as the pivoting lever when operated in the left-right direction. The lever pattern may be arbitrarily changed according to an operating instruction of the operator.

A cutoff lever 1113 provided below the left operation lever 1112 in front of the left frame of the seat 1100 is locked when the cutoff lever 1113 is raised such that the work machine 40 is not moved even when each operation lever 1110, 1111, or 1112 is operated, while functions as an operation lever for releasing the lock when the cutoff lever is lowered.

The information output device 121 includes, for example, a diagonally forward right side image output device 1211, a forward side image output device 1212, and a diagonally forward left side image output device 1213 that are arranged in the diagonally forward right direction, the forward direction, and the diagonally forward left direction of the seat 1100, respectively, as illustrated in FIG. 3. The information output device 121 may further comprise a speaker (audio output device) arranged inside or around the seat 1100.

The operation state detector 112 detects an operation state of the operation device 10 for causing the operator to move the work machine 40. For example, the operation state detector 112 includes a sensor configured to output a signal according to a deformation amount or displacement amount of an urging mechanism comprised of a spring or an elastic member acting to cause the operation lever to be returned to original position and posture corresponding to a lever operation amount of zero, and an arithmetic processing device configured to estimate, based on the output signal of the sensor, that the pivoting lever is operated to pivot at a certain speed in a counterclockwise direction as viewed from above the upper pivoting body 420, and the like.

Alternatively, the operation state detector 112 may include a pressure sensitive sensor or a contact sensor provided to at least one of the operation levers constituting the operating mechanism 111, and the arithmetic processing device configured to estimate that the at least one operation lever is gripped by the operator. Alternatively, the operation state detector 112 may include a pressure sensitive sensor or a contact sensor provided to the seat 1110, and the arithmetic processing device configured to estimate that the operator is sitting on the seat 1110.

Alternatively, the operation state detector 112 may include a pilot pressure sensor configured to output a signal according to a pilot pressure corresponding to an operation amount of the actual machine operation lever provided to the work machine 40, and the arithmetic processing device configured to estimate, based on the output signal of the pilot pressure sensor, that the pivoting lever is operated to pivot at a certain speed in the counterclockwise direction as viewed from above the upper pivoting body 420, and the like.

(Configuration of Remote Operation Server)

The remote operation server 20 comprises a state recognition element 21, and an environment information control process element 22. The state recognition element 21 recognizes an operation state of the remote operation device 10 (or the operating mechanism 111 included in the remote operation device 10) or a motion state of the work machine 40.

The environment information control process element 22 performs the environment information control process in different modes according to a difference in the operation state of the remote operation device 10 or the motion state of the work machine 40 that is recognized by the state recognition element 21. The "environment information control process" refers to an arithmetic process for adjusting each of a plurality of environment information factors that defines an information amount of the environment information to be output by the information output device 121 of the remote operation device 10, such that a data amount of the environment data is reduced.

(Function)

Figure 4:
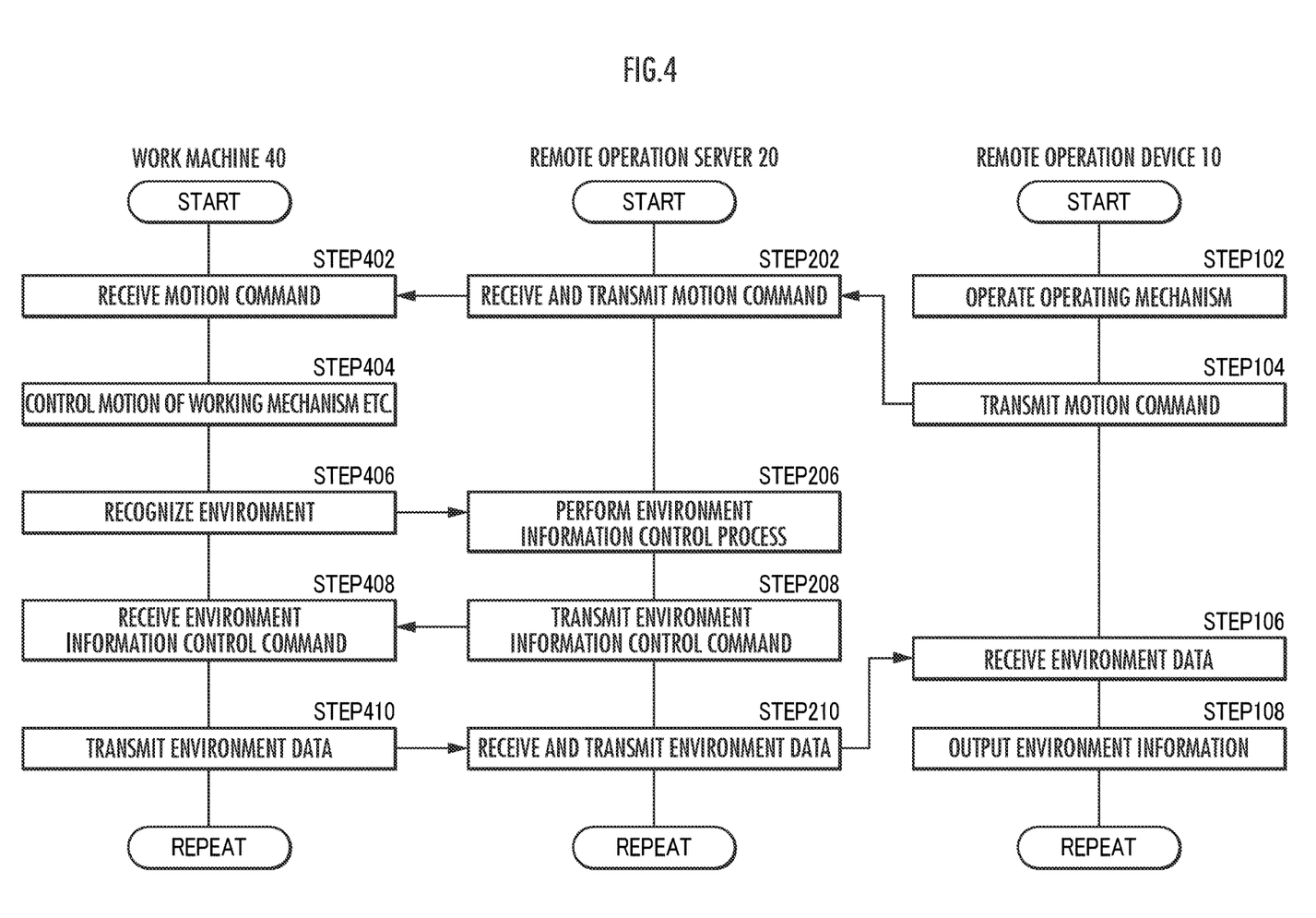
FIG. 4 is an illustrative diagram illustrating functions of a remote operation system as one embodiment of the present invention.

In the remote operation device 10, the operating mechanism 111 is operated by the operator (STEP 102 in FIG. 4), and in response to this, the master control device 100 transmits a motion command according to the operation mode to the remote operation server 20 through the wireless communication device 122 (STEP 104 in FIG. 4).

In the remote operation server 20, the state recognition element 21 receives the motion command from the remote operation device 10, and transmits the motion command to the work machine 40 (STEP 202 in FIG. 4).

In the work machine 40, the slave control device 400 receives the motion command through the wireless communication device 402 (STEP 402 in FIG. 4). In response to this, the motion of the work attachment 440 and the like is controlled by the slave control device 400 (STEP 404 in FIG. 4). For example, work is performed in which earth forward of the work machine 40 is scooped into the bucket 445, and the upper pivoting body 420 is caused to pivot, to thereafter allow the earth to fall from the bucket 445.

In the work machine 40, the environment recognition device 401 acquires a captured image as the environment information (STEP 406 in FIG. 4). At this time, the audio information may be acquired as the environment information. When the master control device 100 controls the wireless communication device 122 so that an operation start command is transmitted from the remote operation device 10 to the work machine 40 through the remote operation server 20, while using this as a trigger, the environment information may start to be acquired. For example, in the remote operation device 10, the operation start command is output when a button or an operation lever included in the input interface 110 or the operating mechanism 111 is operated at a predetermined mode. The environment information acquired by the environment recognition device 401 is transmitted from the work machine 40 and is received by the remote operation server 20.

In the remote operation server 20, the environment information control process is performed by the environment information control process element 22 (STEP 206 in FIG. 4). The "environment information control process" refers to an arithmetic process for adjusting each of a plurality of environment information factors that defines an information amount of the environment information to be output by the information output device 121 of the remote operation device 10, such that a data amount of the environment data is reduced. Specifically, it refers to an arithmetic process for adjusting the plurality of environment information factors in a plurality of patterns, also referred to as "different modes," such that a reduction in the information amount of a "low environment information factor" among the plurality of environment information factors is greater than that of a "high environment information factor" among the plurality of environment information factors. The environment information control process is performed by classifying the environment information factors into the high environment information factor and the low environment information factor in different modes, according to the difference in the operation state that is at least one of a motion command from the remote operation device 10 and the motion state of the work machine 40 according to the motion command.

It may be configured that the environment information control process is performed by the environment information control process element 22 only in the case where a result of the determination as to whether to perform the execution process is affirmative. For example, it may be determined whether the operation state of the operating mechanism 111 according to the motion command is a specified operation state to be subjected to the environment information control process. The motion state of the work machine 40 according to the motion command may be recognized by the communication between the remote operation server 20 and the work machine 40, and it may be determined whether the motion state of the work machine 40 is a specified motion state to be subjected to the environment information control process. The environment information control process element 22 may recognize a communication speed of the communication between the remote operation server 20 and the remote operation device 10 or the work machine 40, and then determine that the communication speed is below the reference value.

Figure 5A:
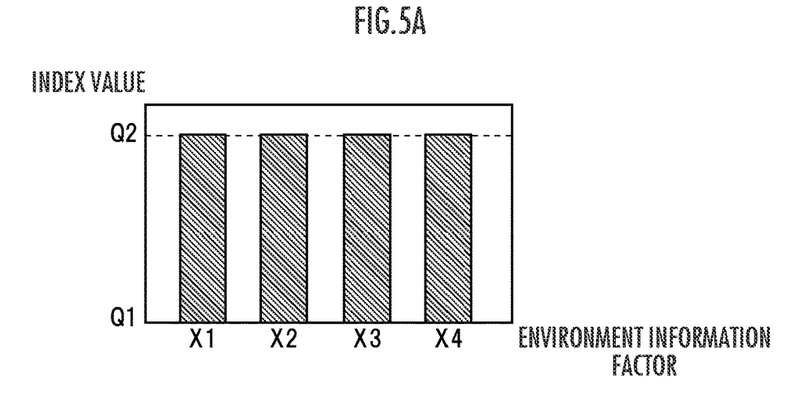
FIG. 5A is an illustrative graph illustrating a control mode for environment information factors in a normal state.
Figure 5B:
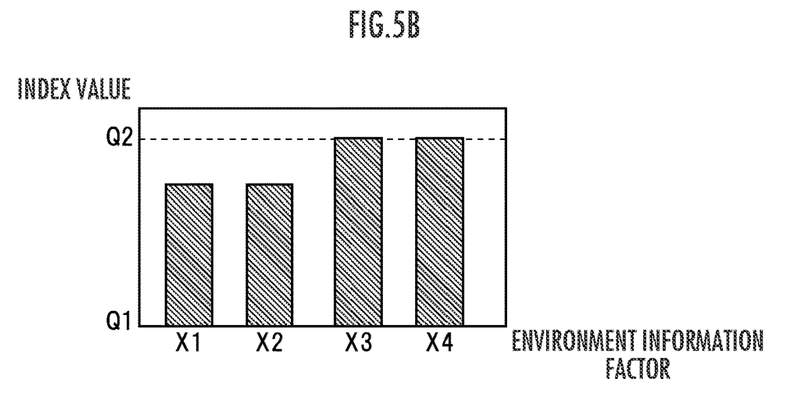
FIG. 5B is an illustrative graph illustrating a first control mode for environment information factors according to an environment information control process.
Figure 5C:
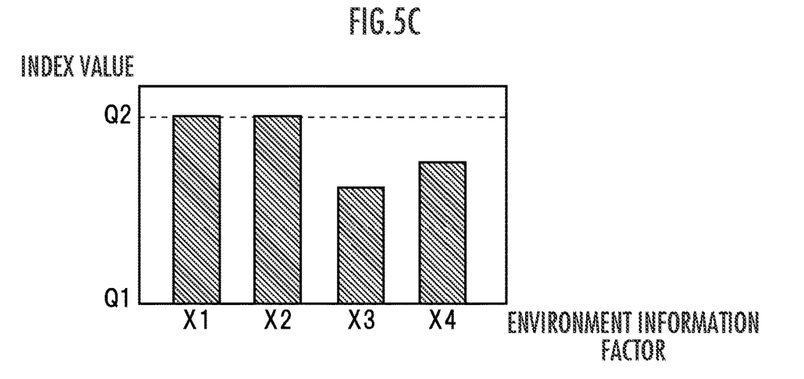
FIG. 5C is an illustrative graph illustrating a second control mode for environment information factors according to the environment information control process.
Figure 5D:
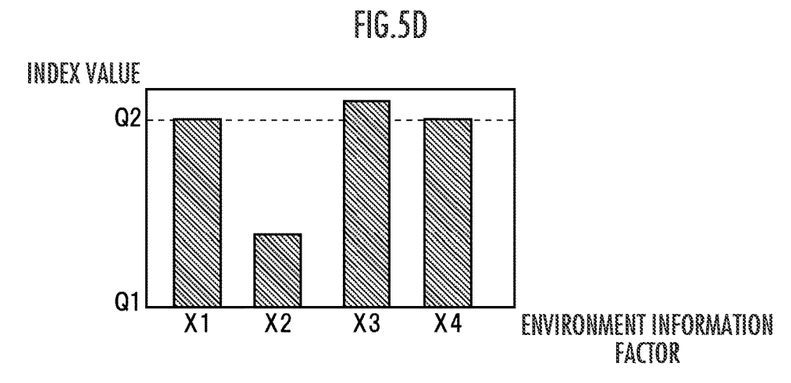
FIG. 5D is an illustrative graph illustrating a third control mode for environment information factors according to the environment information control process.

FIG. 5A shows a situation where each value of four environment information factors X1 to X4 that defines the information amount of the environment information is a reference value Q2 normalized with reference to a lower limit value Q1, in a normal state, i.e., a state where the environment information control process is not performed. When the environment information is an image, the four environment information factors X1 to X4 are, for example, a resolution, a frame rate, the number of dimensions of a pixel value, and a width of an output image range. When the audio is included in the environment information, the plurality of environment information factors include at least one of a sampling frequency, a quantization bit count, and a frequency band of sound, for example. FIGS. 5B to 5D each show a target value or a command value of the four environment information factors X1 to X4, in the case where the operation states of FIGS. 7B to 7D are first to third specified operation states, respectively.

In the first specified operation state, the values of the environment information factors X1 and X2 are lower than the reference value Q2, and the values of the environment information factors X3 and X4 are maintained at the reference value Q2 (see FIG. 5B). In this case, the environment information factors X3 and X4 correspond to the "high environment information factor," and the environment information factors X1 and X2 correspond to the "low environment information factor" to be adjusted such that the reduction in the information amount of the environment information is greater than that for the high environment information factor.

In the second specified operation state, the values of the environment information factors X3 and X4 are lower than the reference value Q2, the reduction amount for the environment information factor X3 is greater than that for the environment information factor X4, and the values of the environment information factors X1 and X2 are maintained at the reference value Q2 (see FIG. 5C). In this case, the environment information factors X1 and X2 correspond to the "high environment information factor," and the environment information factors X3 and X4 correspond to the "low environment information factor" to be adjusted such that the reduction in the information amount of the environment information is greater than that for the high environment information factor. Furthermore, the environment information factor X4 corresponds to the "high environment information factor (or a primary low environment information factor)," and the environment information factor X3 corresponds to the "low environment information factor (or a secondary low environment information factor)" to be adjusted such that the reduction in the information amount of the environment information is greater than that for the high environment information factor.

In the third specified operation state, the value of the environment information factor X2 is lower than the reference value Q2, the value of the environment information factor X3 is higher than the reference value Q2, and the values of the environment information factors X1 and X4 are maintained at the reference value Q2 (see FIG. 5D). In this case, the environment information factor X3 corresponds to the "high environment information factor," and the environment information factors X1, X2, and X4 correspond to the "low environment information factor" to be adjusted such that the reduction in the information amount of the environment information is greater than that for the high environment information factor. Furthermore, the environment information factors X1 and X4 correspond to the "high environment information factor (or the primary low environment information factor)," and the environment information factor X2 corresponds to the "low environment information factor (or the secondary low environment information factor)" to be adjusted such that the reduction in the information amount of the environment information is greater than that for the high environment information factor.

For example, each of the plurality of environment information factors may be adjusted, as shown in Table 1, according to the remote operation state of the work machine 40.

TABLE 1

| | | Environment information factor (↗: increase, ↘|: reduction, —: maintenance with reference to reference value) | | | |
|---|---|---|---|---|---|
| | Operation content | Resolution | Frame rate | Pixel value (color) | Image range |
| A | State of cutoff lever being raised | ↘ | ↘| | ↘ (Gray) | — or ↘| |
| B | State of cutoff lever being raised and gripped | — | ↘| | — (Color) | — |
| C | Pivoting operation of upper pivoting body | ↘ | — | — (Color) | — or ↗ |
| D | Parallel traveling operation of lower traveling body | — | — | — (Color) | — |
| E | Rough excavation | ↘ | — | ↘ (Gray) | — or ↘ |
| F | Finish excavation | = | — or ↘ | =(Color) | — or ↘ |

In Table 1, the state of the cutoff lever being raised (state A) refers to a state where the operator has no intention to operate the work machine 40, and the values of the environment information factors are reduced. However, the value of the image range may be maintained to maintain the field of view.

The state of the cutoff lever being raised and gripped (state B) refers to a state where the operator has no intention to operate the work machine 40, similarly to the state A, and achieves a state where the reduction in the environment information factor is relieved when the operator grips the operation lever. For example, the state indicates a state of the environment information factors being adjusted when it is confirmed that a truck for transporting earth and sand will be moved to a predetermined position. Since the work such as excavation is nor performed, the frame rate can be reduced.

When the pivoting operation of the upper pivoting body (state C) is performed, the resolution is reduced. This object is to reduce the difficulty of viewing the image and the discomfort that are caused by a high-speed movement of the image. On the other hand, the image range can be increased, to secure the visibility in the pivoting direction.

When the parallel traveling operation of the lower traveling body (state D) is performed, highly accurate information is required mainly about the moving direction, and it is desirable that the values of the environment information factors are not reduced. In the case where the reduction in communication load is forced, the maintenance of the image range can take precedence, to secure the visibility in the traveling direction.

The rough excavation operation (state E) refers to a state where the excavation is performed up to a surface away from an excavation plan surface while placing importance on the working speed. The frame rate is maintained, but a problem in work does not appear even when the values of the other environment information factors are reduced. When the work involving movement such as the pivoting is performed, it is desirable that the image range is not reduced.

The finish excavation operation (state F) refers to a state where a remaining earth and sand region on the excavation plan surface after the rough excavation is excavated, for example. In this state, it is desirable that the values of the environment information factors are not reduced. In the case where the reduction in communication load is forced, when the bucket and the like are operated, the values of the environment information factors are reduced without affecting the workability by maintaining the frame rate while reducing the image range. Additionally, in the case where the operation of bucket and the like is poor such as when the operator confirms the working surface, for example, the image range may be maintained while reducing the frame rate.

A grading operation (a combination of the state D and the state E) is also assumed as a combination of the above-described states. When only a leveling work is performed by the bucket, the image range is reduced, but when the traveling operation is added, it is desirable that the image range is not reduced.

Subsequently, in the remote operation server 20, the environment information control process element 22 transmits an environment information control command to the work machine 40 (STEP 208 in FIG. 4). The environment information control command includes the data for specifying the adjustment state of the plurality of factors in addition to the data as to whether the state is the normal state or the specified operation state (whether the environment information control process is performed).

In the work machine 40, the slave control device 400 receives the environment information control command through the wireless communication device 402 (STEP 408 in FIG. 4). The slave control device 400 adjusts a data amount of the environment data indicating the captured image according to the environment information control command, and transmits the data to the remote operation server 20 (STEP 410 in FIG. 4).

In the remote operation server 20, the environment information control process element 22 receives the environment data from the work machine 40, and transmits the environment data to the remote operation device 10 (STEP 210 in FIG. 4).

In the remote operation device 10, the master control device 100 receives the environment data through the wireless communication device 122 (STEP 106 in FIG. 4). The master control device 100 outputs, to the information output device 121, the environment information according to the environment data (all or a part of the captured image itself or a simulated environment image generated based on the captured image, as well as all or a part of recorded audio itself or a simulated environment audio generated based on the recorded audio) (STEP 108 in FIG. 4).

Figure 6A:
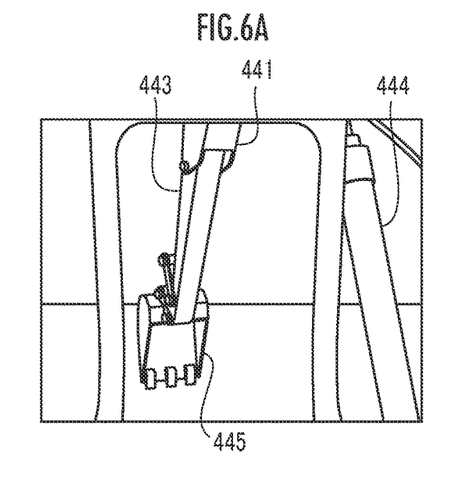
FIG. 6A is an illustrative diagram illustrating environment information in the normal state.
Figure 6B:
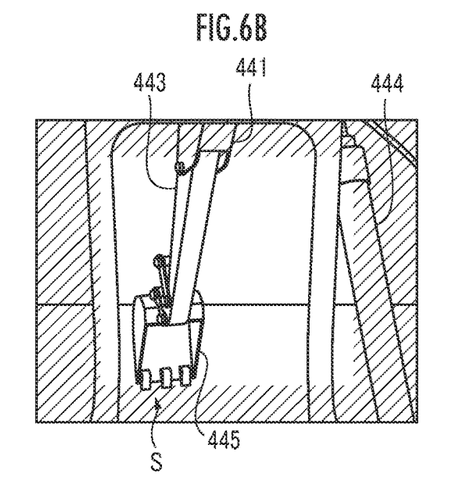
FIG. 6B is an illustrative diagram illustrating the environment information in the environment information control process.

In this way, in the normal state, as illustrated in FIG. 6A, for example, the environment information including the boom 441, the arm 443, the bucket 445, and the arm cylinder 444 that are a part of the work attachment 440 serving as the working mechanism is output to each of a high information output device 121 and a low information output device 221. When the environment information factor X1 is the "output image range the same as that in the normal state" and the environment information factor X2 is the "resolution," in the first specified operation state (see FIG. 5B), the environment information is output to the information output device 121, the information indicating that a part of the environment information (for example, a rectangular region at a center) has the resolution similar to that in the normal state, and the other parts (for example, a region surrounding the partial region in a rectangular shape) have the resolution lower than that in the normal state. Alternatively, when the environment information factor X1 is the "output image range" and the environment information factor X2 is the "resolution," in the first specified operation state, the environment information is output to the information output device 121, the information indicating that only a part has the resolution lower than that in the normal state (see FIG. 6B).

A single image region in the information output device 121 may be specified by the "output image range (or the output image range the same as that in the normal state)" as the environment information factor, or a plurality of image regions may be specified. An image region in which a spread state (specified by shape, size, the position of the center of gravity, and the like) is constant in time series in the information output device 12 may be specified by the "output image range" as the environment information factor, or an image region in which the spread state changes in time series in the information output device 121 such as an image region including the bucket 445 may be specified.

When the environment information factor X3 is the "number of dimensions of a pixel value" and the environment information factor X4 is the "frame rate," in the second specified operation state (see FIG. 7C), the environment information is output to the information output device 121, the information indicating, for example, that the frame rate of the environment information is reduced (24 to 30 FPS to 2 to 10 FPS) and a two-dimensional (four-dimensional in the case where the color is represented by a three-dimensional vector such as RGB values) pixel value including the color and the brightness value in the normal state has a one-dimensional pixel value including only a brightness value (gray scale).

In the case where the information amount of the present environment information is lower than that of the previous environment information, in addition to the present environment information, a predetermined number of pieces of environment information before the previous time may be output from the information output device 121. For example, in the case where the resolution of the present environment image as the environment information is lower than that of the previous environment image, in addition to the present environment information, the previous environment information of a predetermined number of pieces or environment information before the previous time may be output to and displayed on the information output device.

(Effect)

According to the remote operation system thus configured and the remote operation server 20 included in the remote operation system, when the "environment information control process" is performed, each value of the plurality of environment information factors that defines the information amount of the environment information is adjusted. Specifically, the data amount of the environment data is reduced such that the reduction in the information amount of one or a plurality of low environment information factors is greater than the reduction in the information amount of one or a plurality of high environment information factors (meaning the reduction in the information amount of the environment information due to a change in the environment information factor) (STEP 206 in FIG. 4, see FIGS. 5A to 5D). In correspondence to a data amount adjusted such that the reduction in the information amount of the low environment information factors is relatively greater than the reduction in the information amount of the high environment information factors, the data amount can be reduced, and the communication load of the environment data can be reduced. On the other hand, in correspondence to a data amount adjusted such that the reduction in the information amount of the high environment information factors is relatively smaller than the reduction in the information amount of the low environment information factors, the excessive reduction in the data amount, and the excessive reduction in the information amount of the environment information can be avoided.

In the case where the environment information control process is performed by classifying the environment information factors into the high environment information factor and the low environment information factor in different modes such that one of the low environment information factors becomes a high environment information factor for another one of the low environment information factors, the width of the adjustment of the plurality of environment information factors is extended according to the difference in the operation state. Therefore, the excessive reduction in the information amount of the environment information can be avoided in an appropriate form further minutely from the standpoint of an operator appropriately grasping the environment of the work machine 40 according to the operation state of the work machine 40 by the operator while reducing the data communication load for outputting the environment information.

In the case where the environment information control process element 22 performs the environment information control process on condition that a communication speed of at least one of the remote operation device 10 and the work machine 40 falls below a reference value, the excessive reduction in the data amount of the environment data, and the excessive reduction in the information amount of the environment information can be avoided in the state where the necessity to reduce the communication load of the environment data is low.

The environment information control process adjusts each of the plurality of environment information factors in different modes according to a difference in the operation state (at least one state of the motion command according to the operation state of the operating mechanism 111 by the operator and the motion state of the work machine 40 according to the motion command) Specifically, the environment information control process is performed by classifying the environment information factors into the high environment information factor and the low environment information factor in different modes according to the difference (see FIGS. 5A to 5D). Therefore, the excessive reduction in the information amount of the environment information can be avoided in an appropriate form from the standpoint of an operator appropriately grasping the environment of the work machine 40 according to the remote operation state of the work machine 40 by the operator while reducing the data communication load for outputting the environment information (see FIGS. 6A to 6B).

(Other Embodiments of the Present Invention)

In the other embodiments, the environment information control process element 22 included in the remote operation server 20 receives the environment data from the work machine 40 in the same manner as in the normal state, and then performs the environment information control process, whereby the data amount of the environment data to be transmitted to the remote operation device 10 may be adjusted to be increased or reduced.

In the other embodiments, the remote operation server 20 or the environment information control process element 22 may be included in the master control device 100, so that the remote operation device 10 and the work machine 40 can mutually communicate directly or through a radio communication base station. In this case, the environment information control process is performed by the master control device 100 having the same function as that of the environment information control process element 22, whereby the data amount of the environment data to be transmitted from the work machine 40 to the remote operation device 10 may be adjusted to be increased or reduced. The master control device 100 and the remote operation server 20 can mutually communicate through the communication circuit in a common processor or the communication circuit connecting a separate processor.

In the other embodiments, the remote operation server 20 or the environment information control process element 22 may be included in the slave control device 400, so that the remote operation device 10 and the work machine 40 can mutually communicate directly or through a radio communication base station. In this case, the environment information control process is performed by the slave control device 400 having the same function as that of the environment information control process element 22, whereby the data amount of the environment data to be transmitted from the work machine 40 to the remote operation device 10 may be adjusted to be increased or reduced. The slave control device 400 and the remote operation server 20 can mutually communicate through the communication circuit in a common processor or the communication circuit connecting a separate processor.

In the above-described embodiment, the plurality of environment information factors are adjusted by being classified into the high environment information factor and the low environment information factor. However, as the other embodiments, a plurality of environment information factors may be adjusted uniformly without being classified into the high environment information factor and the low environment information factor according to at least one specified operation state of the remote operation device 10 or at least one specified motion state of the work machine 40. That is, all of the plurality of environment information factors may be controlled so that the reduction amount from the reference value Q2 becomes uniform.

In the above-described embodiment, the motion command is transmitted from the remote operation device 10 to the work machine 40 through the remote operation server 20 (see STEP 104 STEP 202 STEP 402 in FIG. 4). However, as the other embodiments, the motion command may be transmitted from the remote operation device 10 to the work machine 40 through a radio communication base station. In this case, the environment information control process element 22 may recognize the motion command or the operation state of the remote operation device 10 according to the motion command based on a result of the communication between the remote operation server 20 and the remote operation device 10. Alternatively, the environment information control process element 22 may recognize the motion state of the work machine 40 according to the motion command based on a result of the communication between the remote operation server 20 and the work machine 40.

In the above-described embodiment, the environment data is transmitted from the work machine 40 to the remote operation device 10 through the remote operation server 20 (see STEP 410→STEP 210→STEP 106 in FIG. 4). However, as the other embodiments, the environment data may be transmitted from the work machine 40 to the remote operation device 10 through a radio communication base station.

In the above-described embodiment, the environment information control process may be performed on condition that the state of the reduction in the information amount of the environment information when the environment information control process is performed is output to the information output device 121, and the performance of the environment information control process is permitted through the input interface 110.

The environment data may include "internal environment data" indicating the motion state of the work machine 40 in addition to "external environment data" indicating external environment of the work machine 40. In this case, the data indicating angles detected by an angle sensor is acquired as the environment data, the angle sensor being provided to the work attachment 440 and configured to detect the angles representing postures of the boom and the arm. For example, in the case where a crawler crane serving as the work machine 40 performs a suspension work, the data indicating the angles of the boom and arm is omitted from the environment data, whereby the data amount of the environment data can be reduced.

REFERENCE SIGNS LIST

10 . . . Remote operation device, 20 . . . Remote operation server, 21 . . . State recognition element, 22 . . . Environment information control process element, 40 . . . Work machine, 100 . . . Master control device, 110 . . . Input interface, 111 . . . Operating mechanism, 112 . . . Operation state detector, 120 . . . Output interface, 121 . . . Information output device, 122 . . . Wireless communication device, 400 . . . Slave control device, 401 . . . Environment recognition device, 402 . . . Wireless communication device, 440 . . . Work attachment (working mechanism)

The invention claimed is:

1. A remote operation system comprising
a work machine including a work mechanism and an imaging device configured to capture an image of an environment including at least a part of the working mechanism;
a remote operation device including an operating mechanism for remotely operating the work machine and a cutoff lever; and
a remote operation server having a function of mutual communication with the work machine and the remote operation device;
wherein the remote operation server is composed of a master control device of the remote operation device or a slave control device of the work machine, and comprises
a state recognition element configured to recognize whether or not the work machine is locked by the cutoff lever such that the work machine is not moved even when the operating mechanism is operated as an operation state of the remote operation device by the operator; and
an environment information control process element configured to perform an environment information control process for adjusting each of a plurality of environment information factors such that a data amount of environment data is reduced in a case where the work machine is locked by the cutoff lever than a case where the work machine is not locked by the cutoff lever, and then to have the captured image received by the remote operation device, the environment information factor being output to an image output device as an information output device included in the remote operation device and defining an information amount of an captured image as environment information according to the environment data acquired by the imaging device, the environment data indicating an environment of the work machine.

2. The remote operation system according to claim 1, wherein
the environment information control process element performs the environment information control process by classifying the plurality of environment information factors into a high environment information factor and a low environment information factor in a plurality of patterns according to a difference in the operation state of the remote operation device or the motion state of the work machine that is recognized by the state recognition element, such that a reduction in an information amount of the environment information according to the low environment information factor is greater than a reduction in an information amount of the environment information according to the high environment information factor.

3. The remote operation system according to claim 2, wherein
the environment information control process element performs the environment information control process by classifying the plurality of environment information factors into the high environment information factor and the low environment information factor in the plurality of patterns such that one of the low environment information factors becomes the high environment information factor for another one of the low environment information factors.

4. The remote operation system according to claim 1, wherein
the environment information control process element performs the environment information control process on condition that a communication speed of at least one of the remote operation device and the work machine falls below a reference value.

5. A remote operation system comprising:
a work machine;
a remote operation device for remotely operating the work machine, and
a remote operation server having a function of mutual communication with the work machine and the remote operation device, wherein
the remote operation server comprises:
a state recognition element configured to recognize an operation state of the remote operation device by an operator or a motion state of the work machine; and
an environment information control process element configured to perform an environment information control process for adjusting each of a plurality of environment information factors in a plurality of patterns according to a difference in the operation state of the remote operation device or the motion state of the work machine that is recognized by the state recognition element so that a data amount of environment data is reduced, the environment information factor being output in an information output device included in the remote operation device and defining an information amount of environment information according to the environment data acquired by an environment recognition device included in the work machine, the environment data indicating an environment of the work machine.

* * * * *